United States Patent
Robinson et al.

(10) Patent No.: US 7,528,906 B2
(45) Date of Patent: May 5, 2009

(54) ACHROMATIC POLARIZATION SWITCHES

(75) Inventors: Michael G. Robinson, Boulder, CO (US); Gary D. Sharp, Boulder, CO (US)

(73) Assignee: Real D, Beverly Hills, CA (US)

( * ) Notice: Subject to any disclaimer, the term of this patent is extended or adjusted under 35 U.S.C. 154(b) by 563 days.

(21) Appl. No.: 11/424,087

(22) Filed: Jun. 14, 2006

(65) Prior Publication Data

US 2006/0291053 A1     Dec. 28, 2006

Related U.S. Application Data

(60) Provisional application No. 60/761,222, filed on Jan. 23, 2006.

(51) Int. Cl.
   *G02F 1/1335*   (2006.01)
   *G02B 27/26*   (2006.01)
(52) U.S. Cl. .............................. 349/96; 349/5; 359/465
(58) Field of Classification Search .................... 349/96, 349/99, 5; 359/465
   See application file for complete search history.

(56) References Cited

U.S. PATENT DOCUMENTS

| | | | |
|---|---|---|---|
| 4,134,644 A | 1/1979 | Marks et al. | |
| 4,281,341 A | 7/1981 | Byatt | |
| 4,620,770 A | 11/1986 | Wexler | |
| 4,692,792 A | 9/1987 | Street | |
| 4,719,507 A | 1/1988 | Bos | |
| 4,792,850 A | 12/1988 | Lipton | |
| 4,995,718 A | 2/1991 | Jachimowicz et al. | |
| 5,260,729 A | 11/1993 | Ullah et al. | |
| 5,537,476 A | 7/1996 | Coteus et al. | |
| 5,564,810 A | 10/1996 | Larson | |
| 5,658,490 A * | 8/1997 | Sharp et al. | 252/299.01 |
| 5,751,384 A * | 5/1998 | Sharp | 349/18 |
| 5,953,083 A * | 9/1999 | Sharp | 349/18 |
| 5,963,371 A | 10/1999 | Needham et al. | |
| 6,046,786 A * | 4/2000 | Sharp et al. | 349/119 |
| 6,078,374 A * | 6/2000 | Sharp et al. | 349/119 |
| 6,252,570 B1 | 6/2001 | Mangerson et al. | |
| 6,380,997 B1 * | 4/2002 | Sharp et al. | 349/119 |
| 6,449,005 B1 | 9/2002 | Faris | |
| 6,608,614 B1 | 8/2003 | Johnson | |
| 6,680,578 B2 | 1/2004 | Antoniadis et al. | |
| 6,698,890 B1 | 3/2004 | Jorke | |

(Continued)

OTHER PUBLICATIONS

Sluyterman et al., 18.2: Architectural Choices in a Scanning Backlight for Large LCD TV's, SID 05 Digest, pp. 996-999 (2005).

(Continued)

*Primary Examiner*—Mike Qi
(74) *Attorney, Agent, or Firm*—Baker & McKenzie LLP

(57) ABSTRACT

An achromatic polarization switch (APS) acts on linear polarized light to provide orthogonal polarized output states over a range of visible wavelengths. In a first switching state, the APS is operable to pass light of a first polarization state therethrough. In a second switching state, the APS is operable to transform light passing therethrough to a substantially orthogonal second polarization state. Used in conjunction with orthogonal analyzing eyewear, left and right eye images are time-sequentially modulated in orthogonal polarization states by the APS to yield a stereoscopic 3D image sensation.

37 Claims, 14 Drawing Sheets

U.S. PATENT DOCUMENTS

| | | | |
|---|---|---|---|
| 6,829,383 | B1 | 12/2004 | Berestov |
| 6,888,529 | B2 | 5/2005 | Bruning et al. |
| 6,911,963 | B2 | 6/2005 | Baba et al. |
| 6,919,950 | B2 | 7/2005 | Darbowski et al. |
| 6,956,964 | B2 | 10/2005 | Lee et al. |
| 6,975,345 | B1 | 12/2005 | Lipton et al. |
| 6,975,369 | B1 | 12/2005 | Burkholder |
| 6,980,177 | B2 | 12/2005 | Struyk |
| 7,002,546 | B1 | 2/2006 | Stuppi et al. |
| 7,002,619 | B1 | 2/2006 | Dean et al. |
| 2003/0089956 | A1* | 5/2003 | Allen et al. ............... 257/432 |
| 2004/0135754 | A1 | 7/2004 | Conner et al. |
| 2005/0007516 | A1 | 1/2005 | Hong et al. |
| 2005/0094267 | A1 | 5/2005 | Huber |
| 2005/0225630 | A1 | 10/2005 | Childers et al. |
| 2006/0007110 | A1 | 1/2006 | Hung et al. |

OTHER PUBLICATIONS

Folkerts, Wiep, 41.3: Invited Paper: LED Backlighting Concepts with High Flux LED's, SID 04 Digest, pp. 1226-1229 (2004).

Ito et al., 17.3: OCB-WV Film for Fast-Response-Time and Wide-Viewing-Angle LCD TV's, SID 05 Digest, pp. 986-989 (2005).

Jak et al., 25.3: Spectrum Sequential Liquid Crystal Display, SID 05 Digest, pp. 1120-1123 (2005).

Ohtsuki et al., 40.5L: Late-News Paper: 18.1-inch XGA TFT-LCD with Wide Color Reproduction using Hgh Power LED-Backlighting, SID 02 Digest, pp. 1154-1157 (2002).

Sugiura et al., 41.4: Late-News Paper: Wide Color Gamut and High Brightness Assured by the Support of LED Backlighting in WUXGA LCD Monitor, SID 04 Digest, pp. 1230-1231 (2004).

Sakai et al., 41.1: A Thin LED Backlight System with High Efficiency for Backlighting 22-in. TFT-LCD's, SID 04 Digest, pp. 1218-1221 (2004).

Zwanenburg et al., 41.2: High-efficiency LEDs for LCD Backlights, SID 04 Digest, pp. 1222-1225 (2004).

Perduijn et al., 43.2: Light Output Feedback Solution for RGB LED Backlight Applications, SID 03 Digest, pp. 1254-1257 (2003).

Sugiura et al., 25.4: Six-Primary-Color 23-in WXGA LCD using Six-Color LEDs, SID 05 Digest, pp. 1124-1127 (2005).

Lee et al., 40.1: Distinguished Contributed Paper: Integrated Amorphous Silicon Color Sensor on LCD Panel for LED Backlight Feedback Control System, SID 05 Digest, pp. 1376-1379 (2005).

Konno et al., 40.2: RGB Color Control System for LED Backlights in IPS-LCD TVs, SID 05 Digest, pp. 1380-1383 (2005).

Lipton et al., An Improved BYATT Modulator, SPIE vol. 3295, pp. 121-126 (1998).

Sugiura et al., 43.5L: Late News paper: Prototype of a Wide Gamut Monitor Adopting an LED-Backlighting LCD Panel, SID 03 Digest, pp. 1266-1269 (2003).

West et al., 43.4 High Brightness Direct LED Backlight for LCD-TV,SID 03 Digest, pp. 1262-1265 (2003).

Taira et al., 43.1: Color Filterless Liquid Crystal Display Illuminated with LEDs, SID 03 Digest, pp. 1250-1253 (2003).

Martynov et al., 43.3: High-efficiency Slim LED Backlight System with Mixing Light Guide, SID 03 Digest, pp. 1259-1261 (2003).

Nesterenko et al., 40.4: Design and Analysis of Tapered Waveguides as Collimators for LED Backlighting, SID 05 Digest, pp. 1388-1391 (2005).

Cheng, Wayne, 40.3: Power Minimization of LED Backlight in a Color Sequential Display, SID 05 Digest, pp. 1384-1387 (2005).

Roosendaal, 25.2: A Wide Gamut, High Aperture Mobile Spectrum Sequential Liquid Crystal Display, SID 05 Digest, pp. 1116-1119 (2005).

International Search Report, transmittal and written opinion of International Searching Authority in co-pending PCT application No. PCT/US06/38356 dated Aug. 9, 2007.

Notification concerning transmittal of international preliminary report on patentability with international preliminary report on patentability in corresponding PCT application No. PCT/US2006/038356 mailed Aug. 7, 2008.

International search report and written opinion of international searching authority for co-pending PCT application No. PCT/US2007/019466 mailed Oct. 16, 2008.

* cited by examiner

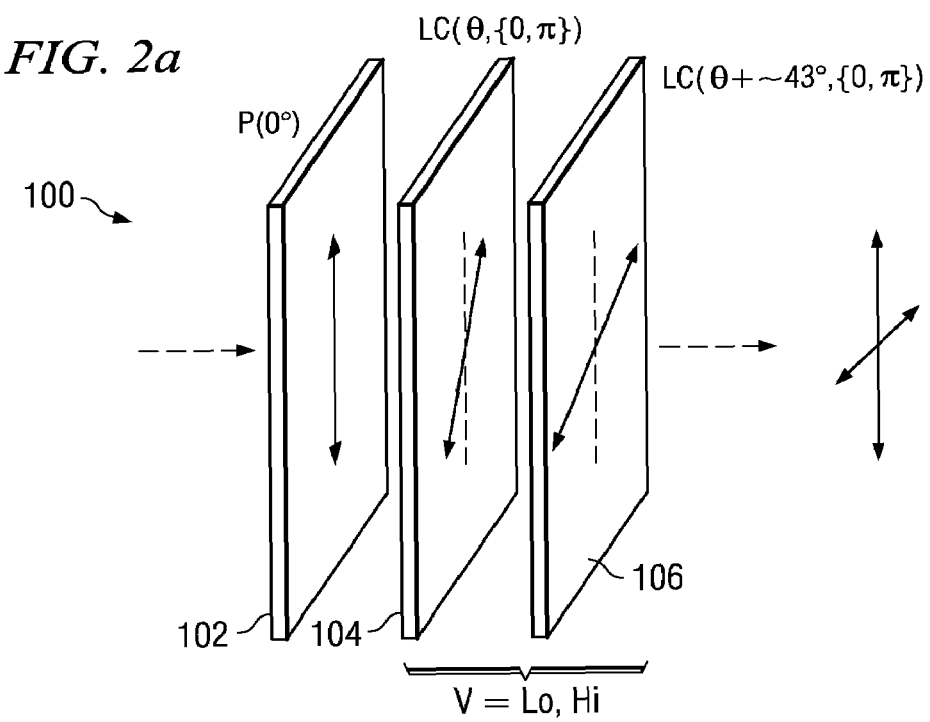
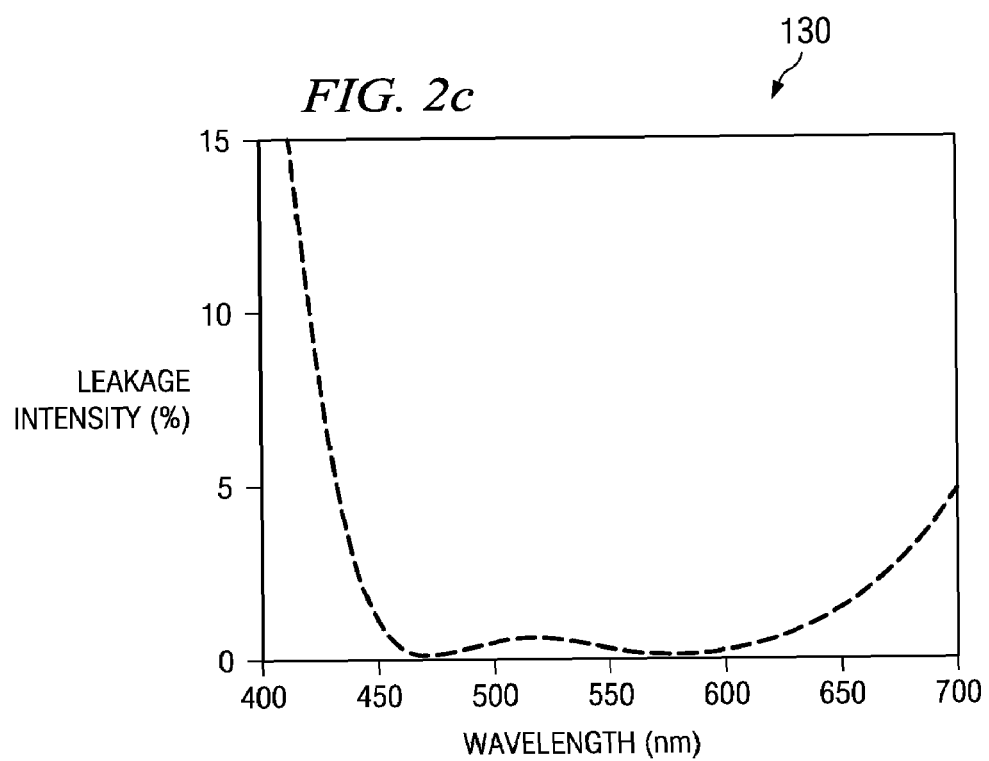

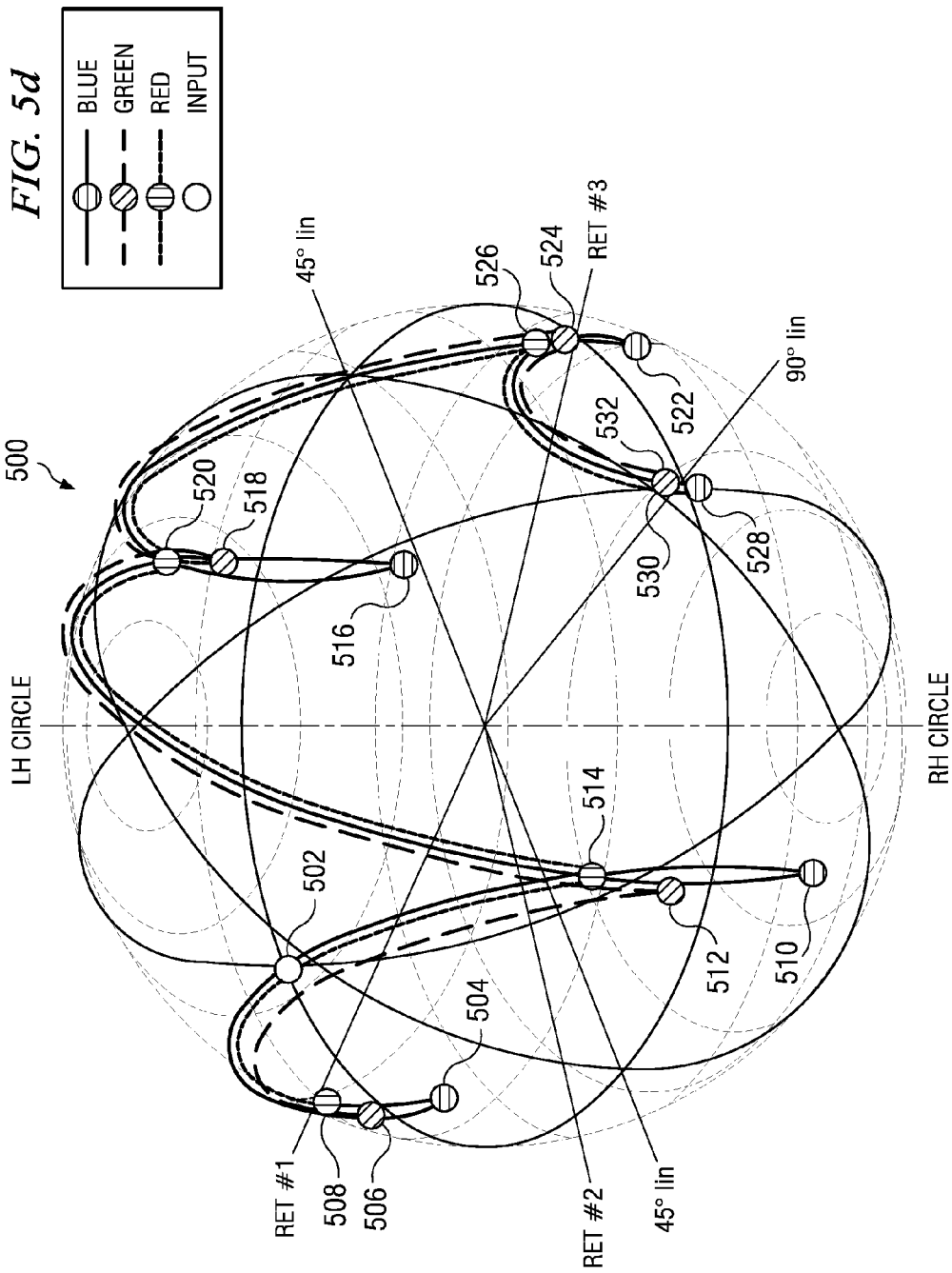

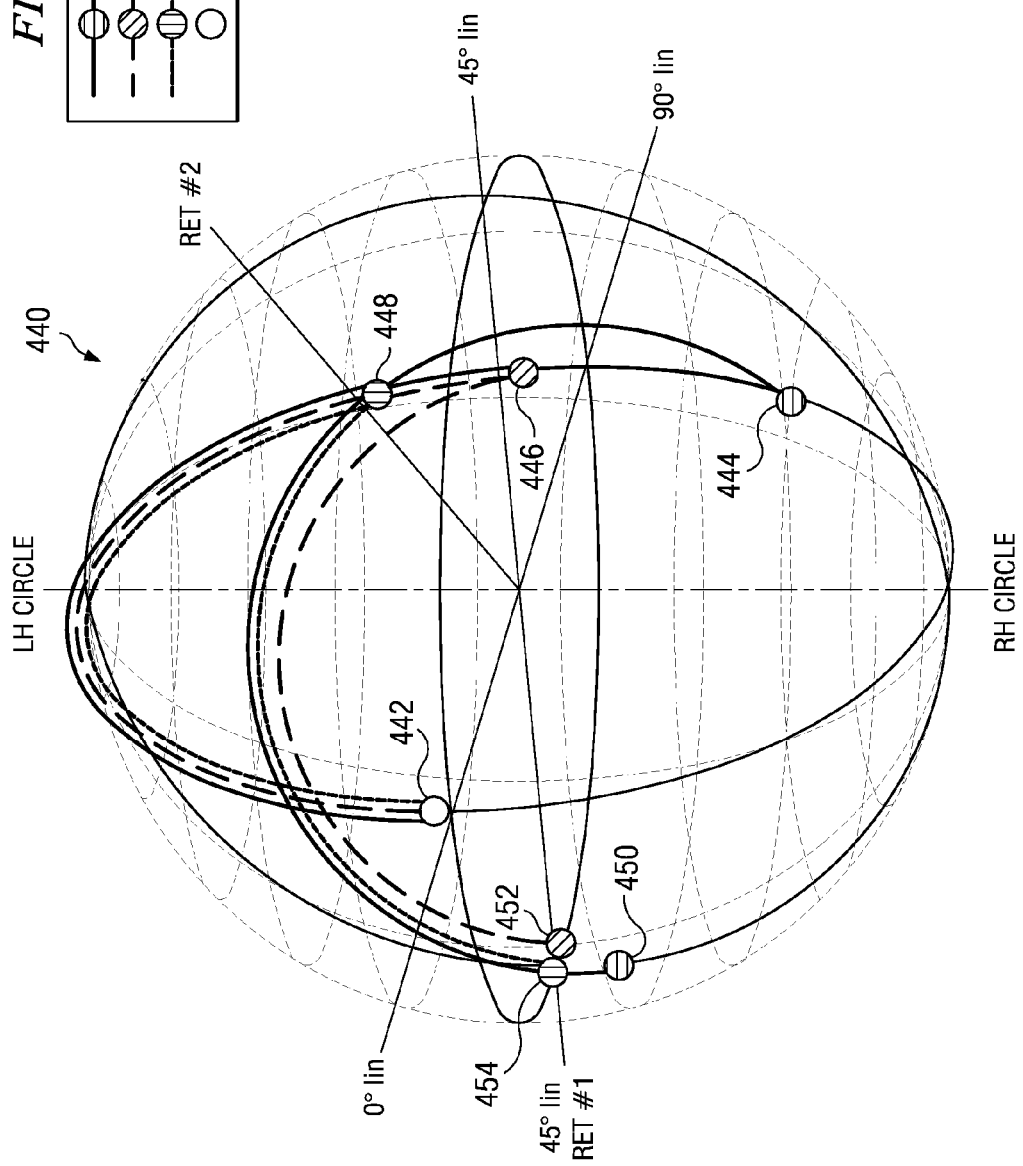

ACHROMATIC POLARIZATION SWITCHES

CROSS REFERENCE TO RELATED APPLICATIONS

This application claims priority to Provisional Application No. 60/761,222, filed Jan. 23, 2006. The entire disclosure of the Provisional Application is incorporated by reference herein.

TECHNICAL FIELD

This disclosure relates generally to achromatic polarization switches (APSs), and more particularly relates to APSs that modulate a visible spectral range of light between orthogonal polarization states. Further, the APSs are directed for use in stereoscopic display systems that modulate the polarization of left and right eye images to provide stereoscopic 3D imagery.

BACKGROUND

Three-dimensional displays can be of several forms. Those such as holographic displays that form an exact optical representation of three-dimensional objects through phase and amplitude modulation of light. Others recreate three-dimensional information using volume displays such as a series of synchronized modulating two-dimensional screens. Although, these approaches more closely reproduce true three-dimensional images, they are very demanding of hardware and at present can only form very crude images. A more practical approach is to form stereoscopic images in which one image is seen only by the right eye and a second image by the left. The difference between the images yields depth information, thereby providing a strong three-dimensional sensation, whereby objects appear to be a few meters away from a viewer in a cinema environment.

Conventionally, stereoscopic images are viewed through eyewear that discriminates between the eyes. Eyewear can discriminate through color as used in so-called anaglyph stereo systems. One eye can be made to see one portion of the visible spectrum while the other eye sees a complementary portion of the spectrum. Encoding the stereoscopic images in the same color bands can yield a three-dimensional sensation although the observable difference in what the eyes see causes fatigue.

Contrasted to color-based left/right stereoscopic discrimination, an alternative method of eyewear discrimination is to use polarization. One eye can be made to see one polarization and the other its orthogonal counterpart by making eyewear with lenses made from orthogonally aligned linear polarizers. Though less fatiguing to the eye than anaglyph eyewear, linear polarization states demand restriction on the orientation of the viewer's head. Another polarization-based solution is to use orthogonal left and right circularly polarized light for the two stereo image channels, thereby reducing the orientation constraints of the viewer's head.

Stereoscopic systems that encode separately left and right eye information traditionally use two projectors or spatially interlaced direct view displays. A more attractive approach uses a single display with an optical modulator allowing alternate frames to be viewed by different eyes. Shutter glasses that have liquid crystal modulating lenses can discriminate temporally and work well with a single fast display such as a conventional CRT. Passive eyewear with polarization modulation of left and light eye images from a single fast projector is preferred however for large projected images with multiple viewers.

A known approach to 3D projection involves the polarization switch (z-screen), which is chromatic in performance, and has been described in detail in U.S. Pat. No. 4,792,850 issued Dec. 20, 1988 to Lipton et al. In a known cinema system using the teachings of Lipton, a high frame rate (>100 Hz) three-chip (RGB) DLP projector creates alternate left and right eye images in synchronization with the z-screen, which creates substantially circular polarized states, but exhibits significant chromatic performance. Furthermore the eyewear has to be of a matching circularly polarized form adding cost to a presentation relative to a linear polarized system.

FIG. 1a illustrates Lipton's z-screen switch 10, which consists of paired nematic liquid crystal (LC) quarter wave switches 14, 16 oriented at 90° to each other and at 45° to the required input polarizer 12. The Z-screen switch 10 is used with passive circular polarized eyewear for stereo projection.

In one state, where a low voltage is applied to a first LC cell 14 and a high voltage to a second LC cell 16, the z-screen 10 creates left handed circularly polarized output light for a specific design wavelength, typically 550 nm. By swapping voltages, right handed polarization is produced. By making the analyzing circular polarizing (CP) eyewear matched to the z-screen 10 and aligned at the correct orientation angle, it is possible to create near perfect chromatic blocking for the viewer. That is, the right eye image is solely seen by the right eye with no contamination or cross-talk from the image destined for the left, and vice versa. However, under this condition the correct right eye image is deficient of red and blue light when compared to the original image requiring color balance and associated light loss. Furthermore, chromatic behavior is seen when the eyewear is oriented such as when the viewer tilts his or her head. Although the circularly encoded polarization state minimizes cross-talk as a function of head tilt (and indeed perfectly suppresses it for the light around 550 nm for which it is designed), magenta light is seen to contaminate at a level that can be noticeable under certain conditions.

FIG. 1b is a graph 20 showing the relation of leakage intensity to wavelength of z-screen modulated light. Indeed, the extent of the chromatic performance of the incumbent z-screen 10 can be illustrated by analyzing the output with an ideal achromatic circular polarizer. For blue and red light wavelengths either side of 520 nm, the polarization states are elliptical leading to a chromatic performance. Such chromatic behavior that is wavelength-dependent and influenced by head tilt is undesirable as it affects the viewing experience.

BRIEF SUMMARY

Generally, achromatic polarization switches (APSs) act on linear input polarized light to create substantially orthogonal polarized output states for a range of visible wavelengths.

In accordance with an APS embodiment, an achromatic polarization switch that transforms linearly polarized light of an initial polarization orientation includes a first liquid crystal (LC) pi-cell having a first axis of orientation relative to the initial polarization orientation, and a second LC pi-cell having a second axis of orientation relative to the first LC cell. The switch may further include a driver electrically coupled to the first and the second LC pi-cells. The driver may bias the first and the second LC pi-cells between a first state and a second state, in which the first state is operable to transform light passing through the switch to a first linear polarization orientation, and wherein the second state is operable to transform light passing through the switch to a second linear polarization orientation that is substantially orthogonal to the first linear polarization orientation. The polarization switching device may be combined with additional achromatic or chromatic polarization elements to provide other embodiments (and equivalents and variations thereof) including those providing orthogonal achromatic linear and achromatic circularly polarized states and those providing highly chromatic linear and circular states.

In accordance with another APS embodiment, an achromatic polarization switching device that transforms linearly polarized light of an initial polarization orientation includes a half-wavelength retarder, and a surface stabilized ferroelectric liquid crystal (SSFLC) cell. The half-wavelength retarder is located on an optical path following the linear polarizer and is oriented at substantially 45 degrees to the transmission axis. The SSFLC cell has a retardance of a half wavelength, and the optic axis orientation of the SSFLC alters in response to an applied electric field.

In accordance with an aspect, a projection system provides achromatic stereoscopic imaging. The projection system includes a projection subsystem operable to output modulated light and an achromatic polarization subsystem operable to modulate light from the projection subsystem. The achromatic polarization subsystem utilizes an APS according to the present disclosure to time-sequentially alter the output polarization state of a display in synchronization with time sequential images from the projector subsystem. A viewer may then use appropriate eyewear to analyze the images such that right eye images are seen in the right eye and left eye images are seen in the left eye. Suitable stereo images would then result in a 3D image sensation.

BRIEF DESCRIPTION OF THE DRAWINGS

For a more complete understanding of embodiments of the invention, and features of the systems and methods herein, reference is now made to the following descriptions taken in conjunction with the accompanying drawings, in which:

FIG. 2a is a schematic diagram illustrating a first exemplary embodiment of an achromatic polarization switch (APS) in accordance with the present disclosure;

FIG. 2b is a Poincaré sphere graph illustrating the polarization transformations of the APS of FIG. 2a;

FIG. 2c is a graph showing the leakage spectra of the APS of FIG. 2a;

FIG. 4b is a graph illustrating the spectral leakage of the embodiment of FIG. 4a;

FIG. 5b is a graph illustrating the spectral leakage of an exemplary embodiment of the APS that is described with reference to FIG. 5a;

FIG. 5d is a Poincaré sphere graph illustrating the polarization transformations performed by an exemplary embodiment of the APS that is described with reference to FIG. 5a, when the ZTN LC cells each impart substantially half-wave retardance;

FIG. 7b is a graph illustrating the spectral leakage of the fifth exemplary embodiment of the APS that is described with reference to FIG. 7a;

FIG. 7c is a Poincaré sphere graph illustrating the polarization transformations of the fifth exemplary embodiment of the APS when operating in a first state that is described with reference to FIG. 7a;

FIG. 7d is a Poincaré sphere graph illustrating the polarization transformations of the fifth exemplary embodiment of the APS when operating in a second state that is described with reference to FIG. 7a;

DETAILED DESCRIPTION

As disclosed herein, an achromatic polarization switch (APS) acts on linear input polarized light to create substantially orthogonal linearly polarized output states for all wavelengths. Combining these components with additional achromatic or chromatic polarization elements provides a range of polarization switches, a subset of which include those imparting achromatic circularly polarized states. This latter approach can be used with matched achromatic eyewear to create a passive polarization eyewear stereoscopic system requiring no color balance (and its associated loss) which is tolerant of head-tilting.

Figure 1A:
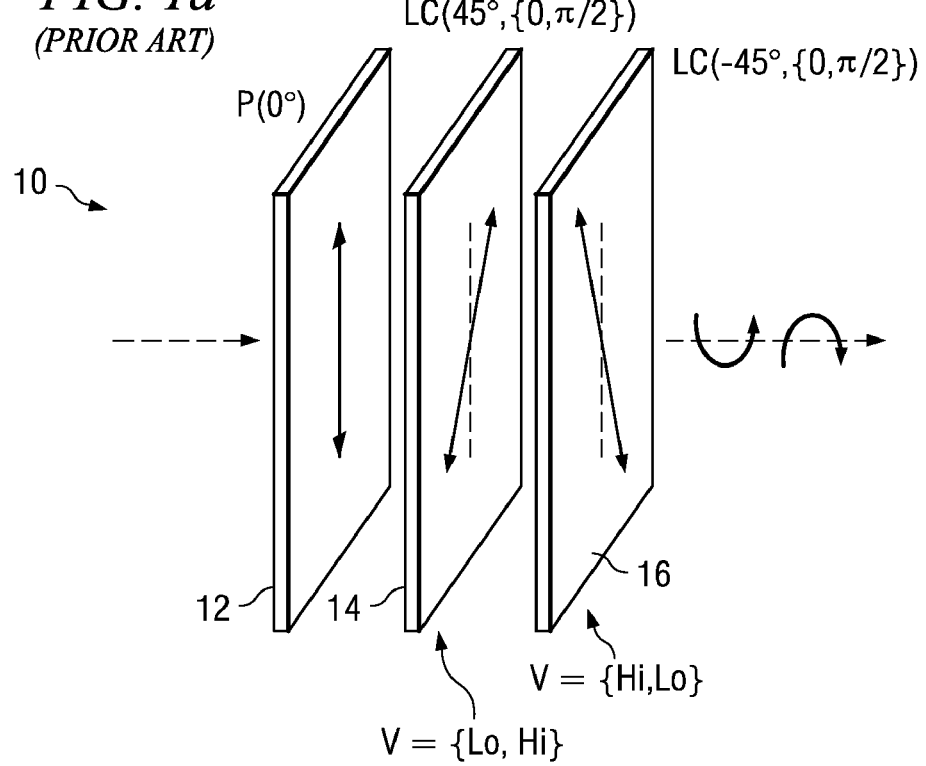
FIG. 1a is a schematic diagram of a known polarization switch (z-screen) used in time sequential, circularly polarized stereo projection systems.
Figure 1B:
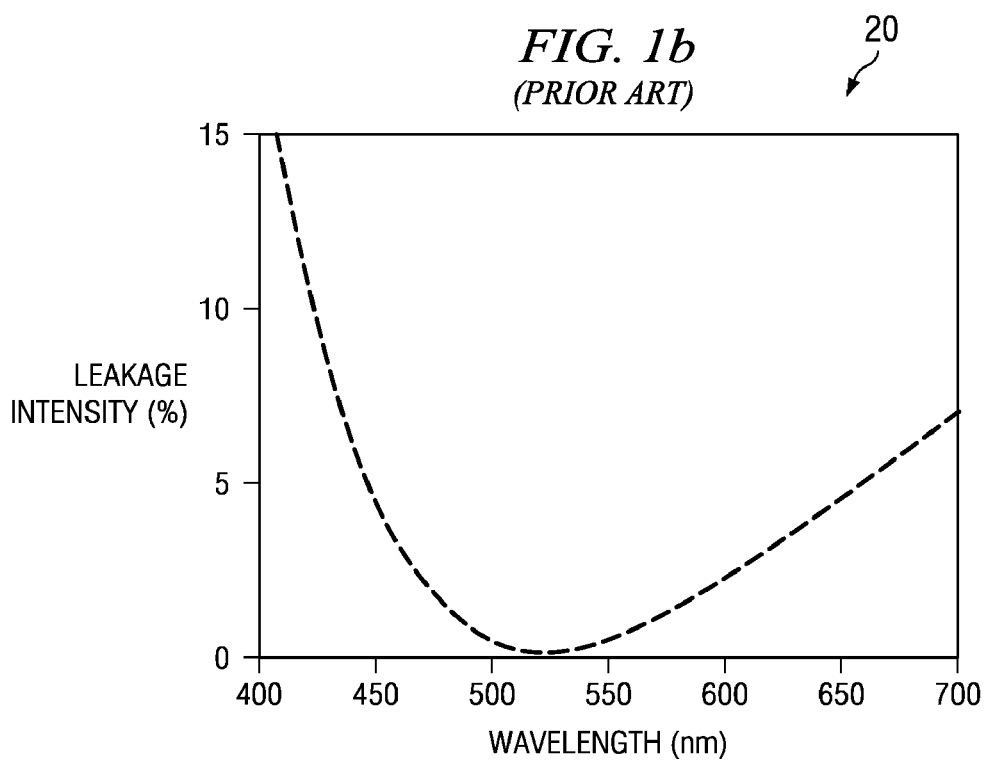
FIG. 1b is a graph illustrating the leakage of light polarized using the known polarization switch of FIG. 1a through an ideal achromatic circular analyzer as an indication of its chromatic behavior.

To effectively transform the polarization state of light of a single wavelength to one that is orthogonal requires at least a half-wave of retardance. In the simplest case of switching a single wavelength between linear polarized states, the optic axis of the half wave retarder is at 45° to the input polarization. A switch at this single wavelength could therefore constitute an LC device that in one state imparts a half-wave retardance at 45° and in another state, is effectively isotropic. This is the basis of many LC modulating structures used, for example, in LCD displays. Its isotropic state yields an achromatic black between crossed polarizers at the expense of a chromatic white state. Color balancing this white state leads to undesirable light loss. It can be shown that a single zero-twist nematic (ZTN) liquid crystal switching between zero and a half wave retardance cannot perfectly transform more than one wavelength between orthogonal polarization states regardless of additional passive retarder layers. Hence the characteristic chromatic behavior of a single ZTN modulator. With the prior art z-screen described in FIG. 1, the two quarter wave liquid crystal cells are oriented at 90 degrees, making the net switched retardance the minimum half wave and thus exhibits similar chromaticity. In general, achromatic switching demands more than a single ZTN cell that switch a net retardance of greater than a half wave, and typically closer to a full wave, for visible wavelengths close to 550 nm. Hence the APS embodiments of this patent use two ZTN cells or their equivalent.

FIG. 2a illustrates a first exemplary embodiment of an APS 100. APS 100 includes an input polarizer 102, a first zero-twist nematic liquid crystal (ZTN LC) pi-cell 104, and a second ZTN LC pi-cell 106. In this embodiment, first ZTN LC pi-cell 104 may be oriented at approximately 22.5° relative to the transmission axis of input polarizer 102, and second ZTN LC pi-cell 106 may be oriented in a range of approximately 40° to 45° relative to first ZTN LC pi-cell 104. In an embodiment, second ZTN LC pi-cell 106 is oriented at approximately 67.5° relative to the transmission axis of input polarizer 102. Accordingly, pi-cells 104 and 106 may be biased each impart a half wave retardance in a first state, or be isotropic and impart no retardance in a second state.

As used herein, $R(\theta°, \{\Gamma_1, \Gamma_2\})$ is shorthand for a retarder oriented at $\theta°$ with respect to the input polarization, and $\Gamma_1, \Gamma_2$ are the two retardance states of the LC cell expressed in radians. Further, as used herein, $\pi$ radians of retardance is equivalent to a half wave at a given design wavelength (e.g. $\lambda/2$, or 275 nm at 550 nm). Thus, in an embodiment, ZTN LC pi-cell 104 may be represented as $R(\sim 22.5°, \{0,\pi\})$, and ZTN LC pi-cell 106 may be represented as $R(\sim 67.5°, \{0,\pi\})$.

In operation, in the first state, the LCs of the ZTN LC pi-cells 104, 106 are in their relaxed low voltage state (~3V is typical) and impart substantially 260 nm of retardance at a wavelength of 520 nm. In the second state, the driven state, ZTN pi-cells 104, 106 are isotropic and should impart no retardance on the light, providing achromatic preservation of the incoming linear polarization state. In practice, however, LC pi-cells 104, 106 retain a small residual (in-plane) retardance that is seen by normally incident light, and the remaining cell birefringence that is oriented out-of-plane affects light with off-normal incidence. These two effects may be compensated using principles described in commonly assigned U.S. Pat. No. 6,816,309, issued Nov. 9, 2004 to Chen et al., U.S. Pat. No. 6,961,179 and in MICHAEL G. ROBINSON, JIANMIN CHEN & GARY D. SHARP, POLARIZATION ENGINEERING FOR LCD PROJECTION (Wiley & Sons 2005) (hereinafter "Polarization Engineering for LCD Projection"), which are hereby incorporated by reference herein for all purposes, to ensure good performance of the proposed APS. Additional compensation principles are also discussed below in the section entitled "Compensation Elements and Design Considerations," and with regard to other exemplary embodiments disclosed herein.

Figure 2B:
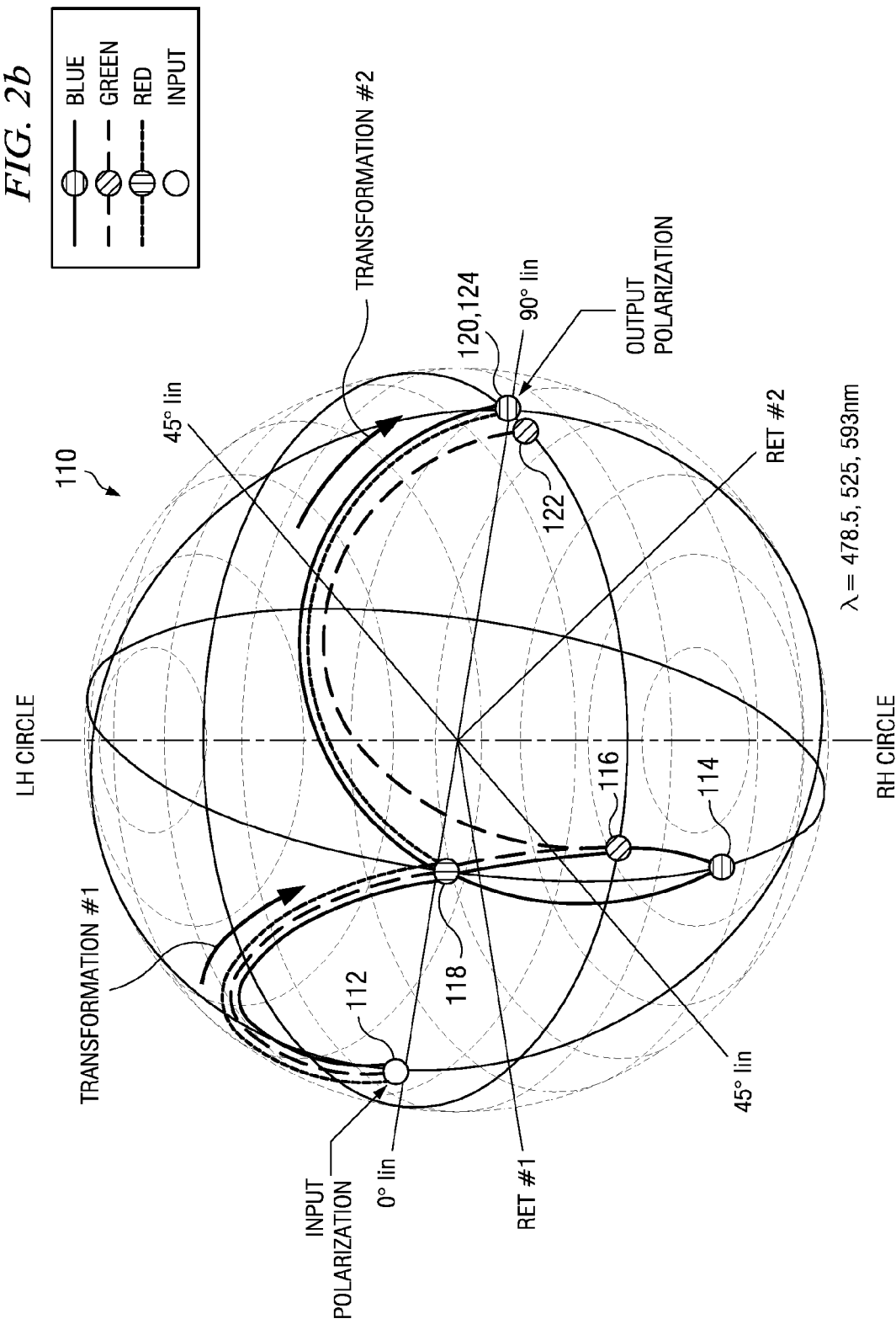

FIG. 2b is a Poincaré sphere graph 110 illustrating the polarization transformations of the APS 100 of FIG. 2a. The transformations can be visualized on the Poincaré sphere 110 for two successive ZTN LC pi-cells 104 and 106, as shown in FIG. 2a. From FIG. 2b, it is clear that several solutions exist for different retarder angles close to 22.5° and 67.5° that substantially map two wavelengths onto a single output state orthogonal to the first. For example, point 112 represents input linearly polarized light, which undergoes a first transformation (through ZTN LC pi-cell 104) to point 114 for blue light, to point 116 for green light, and to point 118 for red light. A second transformation (through ZTN LC pi-cell 106) then maps points 114, 116, 118 to points 120, 122, 124 respectively, providing output linearly polarized light that is substantially orthogonal to the input linearly polarized light.

FIG. 2c is a graph 130 showing the resulting 'W-like' spectral leakage of the achromatic solution of FIG. 2a when analyzed with a linear polarizer, which is characteristic of an achromatic solution. Using typical dispersions of fast, high birefringence LC materials suitable for LC pi-cells 104 and 106, the leakage when analyzed with an ideal linear polarizer is optimized with LC orientation angles of 23.5° and 66.5°. The inherent 'W-like' nature of these successive cell solutions, however, limits the overall performance of this approach.

Figure 3:
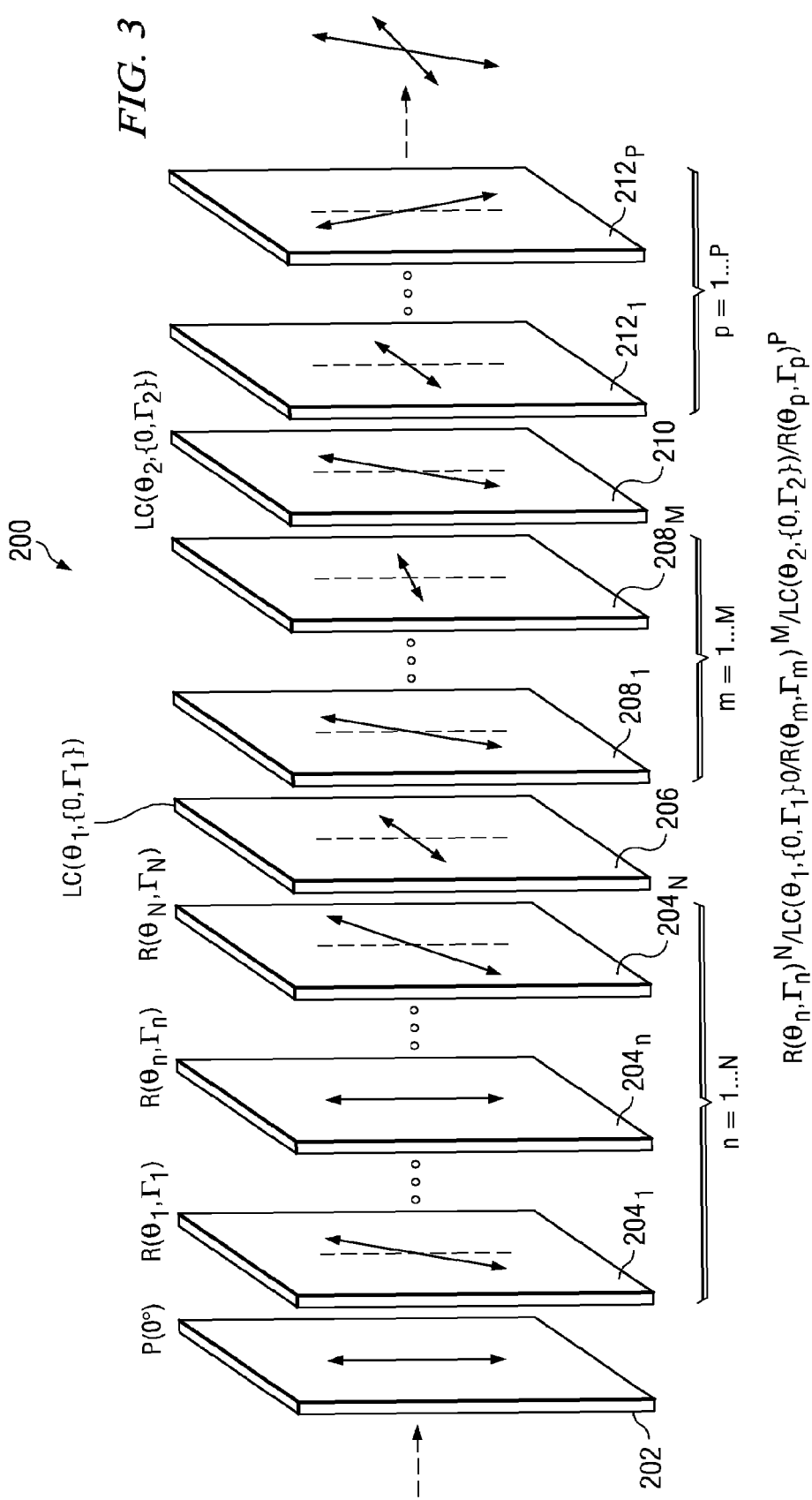
FIG. 3 is a schematic diagram illustrating a general solution for an APS in accordance with the present disclosure.

FIG. 3 illustrates an exemplary general solution for an APS 200. This general solution introduces one or more retarders among and/or between the LC switches to address the comparatively deficient achromatic performance of the embodiment shown in FIG. 2a. In accordance with this general solution, APS 200 includes input polarizer 202, retarders $204_1$ through retarders $204_n$, followed by first ZTN LC cell 206, followed by retarders $208_1$ though retarders $208_M$, followed by second ZTN LC cell 210, followed by retarders $212_1$ though retarders $212_P$, where n is an integer from 1 to N, m is an integer from 1 to N, and p is an integer from 1 to P. In shorthand, the general two LC APS 200 can be written as $R(\theta_n, \Gamma_n)^N / LC(\theta_1, \{0, \Gamma_1\}) / R(\theta_m, \Gamma_m)^M / LC(\theta_2, \{0, \Gamma_2\}) / R(\theta_p, \Gamma_p)^P$.

As discussed above, with additional retarders, the net retardance switched should be substantially a full wave, in which the two LC cells each switch between states of no retardance and states of substantially half wave retardance. Although introducing additional passive retarders other than a half wave can be considered, most favorable results have been found for those tending toward a half wave retardance. With all half wave solutions a relationship between retarder orientations can be derived. Specifically a series of N half-wave retarders may transform the design wavelength to an orthogonal state if the following angular relationship is held:

$$90° = \pm 2 \sum_{n=1}^{N} (-1)^{N-n} \theta_n$$

where $\theta_n$ is the orientation in degrees from the input polarization orientation of the $n^{th}$ retarder. Typically the positive solution (i.e. the +ve of the two ± options) yields the most achromatic polarization transforming system and is used to derive the relative angle orientations of the embodiments to follow.

Figure 4A:
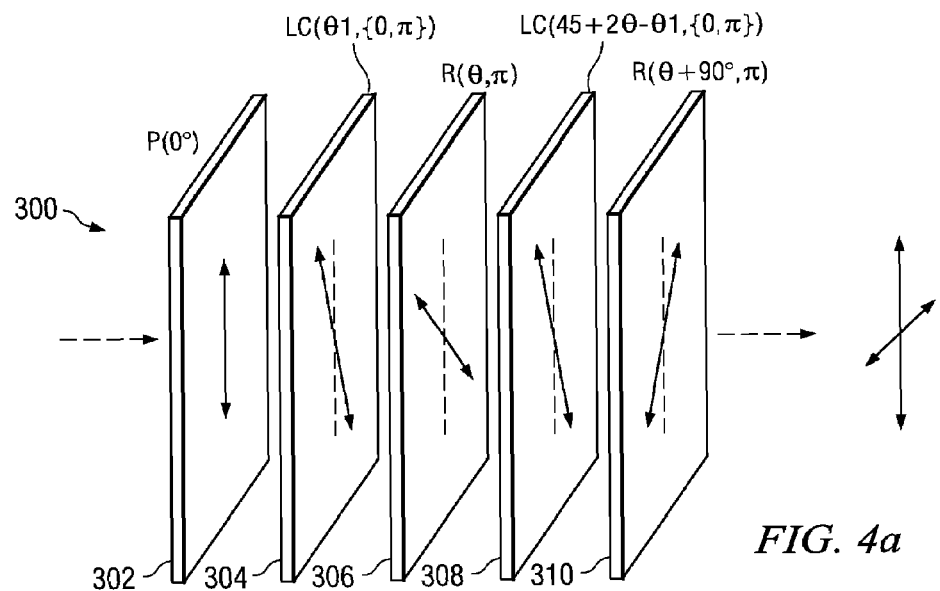
FIG. 4a is a schematic diagram illustrating a second exemplary embodiment of an APS in accordance with the present disclosure.

FIG. 4a is a diagram of a second exemplary embodiment of an APS 300. APS 300 includes linear polarizer 302, first and second ZTN LC pi-cells 304, 308 interleaved with first and second crossed passive retarders 306, 310, arranged as shown. APS 300 provides an achromatic high voltage state since the passive retarders are orthogonal.

In an embodiment, first LC pi-cell 304 has an orientation of $\theta_1$ degrees, with a first retardance state of zero with respect to the input polarization when driven in a high voltage range, and a second retardance state of $\pi$ radians when driven in a low voltage range. Second LC pi-cell 308 has an orientation of $(45°+(2\theta-\theta_1))$ degrees with respect to the input polarization, with a first retardance state of zero with respect to the input polarization when driven in a high voltage range, and a second retardance state of $\pi$ radians when driven at a low voltage range. First retarder 306 is oriented at $\theta°$ to the input polarization, and has a retardance of $\pi$ radians. Second retarder 310 is oriented at $(\theta+90°)$ to the input polarization, and has a retardance of $\pi$ radians.

Figure 4B:
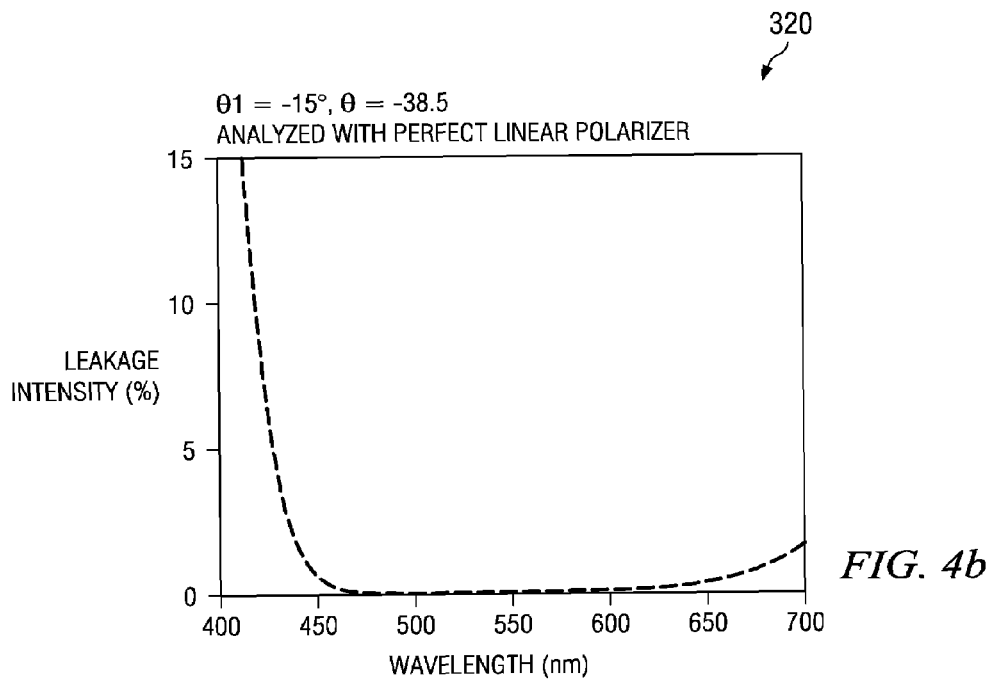

FIG. 4b is a graph 320 illustrating the spectral leakage of the embodiment of FIG. 4a when analyzed with ideal linear polarizers for values $\theta_1 = -15°$ and $\theta = -38.5°$, which yields the good achromatic performance shown in FIG. 4b.

Figure 5A:
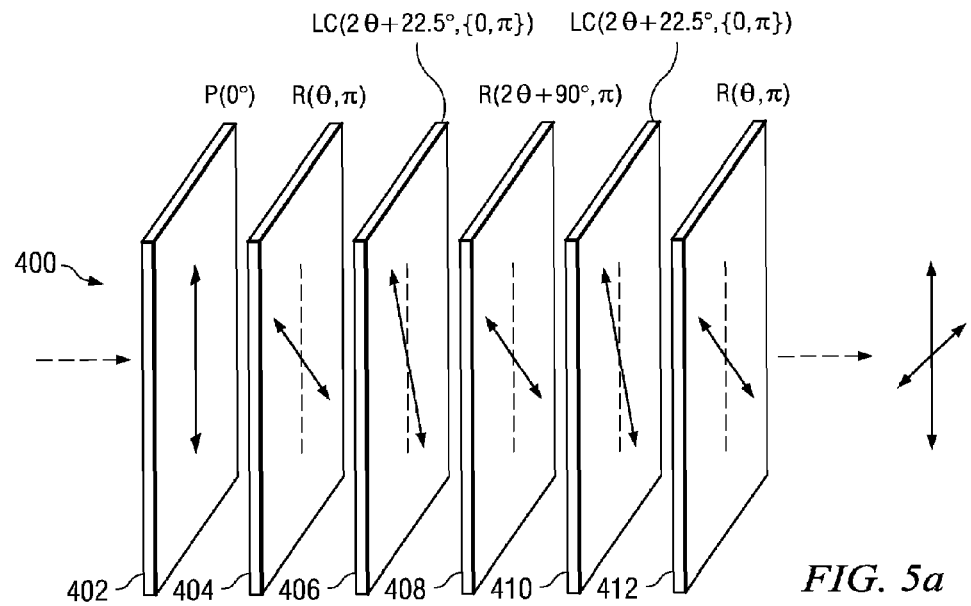
FIG. 5a is a schematic diagram illustrating a third exemplary embodiment of an APS in accordance with the present disclosure.

FIG. 5a illustrates a third exemplary embodiment of an APS 400. APS 400 includes an input polarizer 402, retarder 404, first LC pi-cell 406, retarder 408, second LC pi-cell 410, and retarder 412, arranged as shown. APS 400 provides a substantially symmetric arrangement in which the number and angles of retardation components 404, 412 either side of a central retarder 408 are substantially identical.

It is known from U.S. Pat. No. 6,380,997 to Sharp et al., filed Dec. 17, 1999, and herein incorporated by reference, that a $R(\theta,\pi)/R(2\theta+90°,\pi)/R(\theta,\pi)$ configuration has a wavelength stable optic axis oriented at 0°. Accordingly, if symmetrically oriented LC pi-cells 406, 410 are used according to this configuration, they should impart substantially zero retardance, therefore providing a chromatic state almost independent of the angle θ.

Here, the driven state comprising the transformations of the three passive retarders (or retarder stacks) 404, 408, 412 ($\theta_1, \theta_3, \theta_5$) provide a compound retarder with a stable optic axis at 0°, where:

$$\theta_3 = 90° + 2\theta_1 \text{ and } \theta_5 = \theta_1$$

Conforming to this criterion will therefore provide that the input polarization state is well preserved in the driven state irrespective of $\theta_1$. Calculating an all-the-half-wave solution provides a structure:

$$R(\theta,\pi)/LC(2\theta+22.5°,\{0,\pi\})/R(2\theta+90°,\pi)/LC(2\theta+22.5°,\{0,\pi\})/R(\theta,\pi)$$

shown in FIG. 5a, where the angle relationships arise from providing that 0° linearly polarized light of the design wavelength (i.e. the one at which the retarders impart half-wave retardance) gets transformed into orthogonal 90° linear polarization. The first and second LCs may both be oriented at 2θ+22.5 degrees. In the relaxed LC state, the angular relationship above that provides transformation of the design wavelength may be used, leading to the generic angular relationships of FIG. 5a.

Figure 5B:
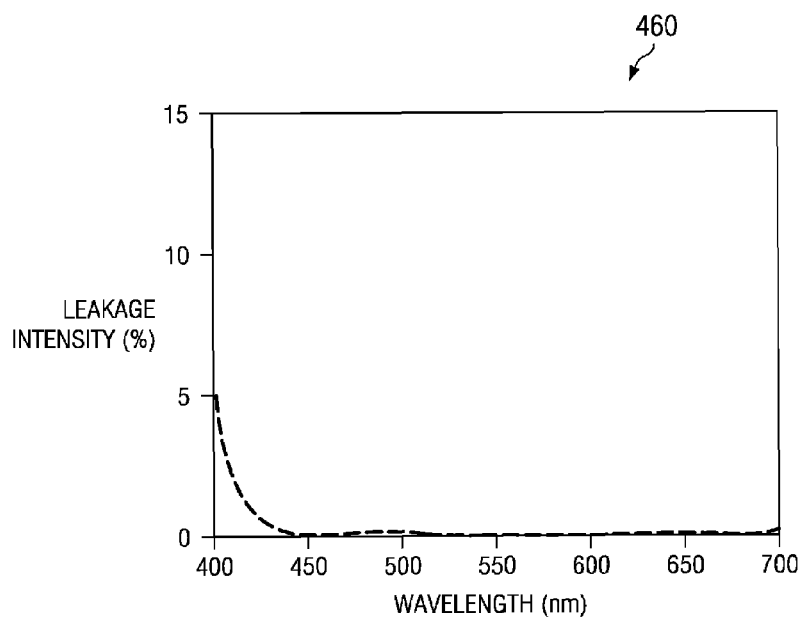

Altering the angular variable θ may provide several good achromatic solutions. For instance, an embodiment with a structure described with reference to FIG. 5a and having θ=8° yields the good spectral performance shown in FIG. 5b for the relaxed state. In this embodiment, the driven state leakage is substantially zero throughout the visible on the scale of this graph 460.

Figure 5C:
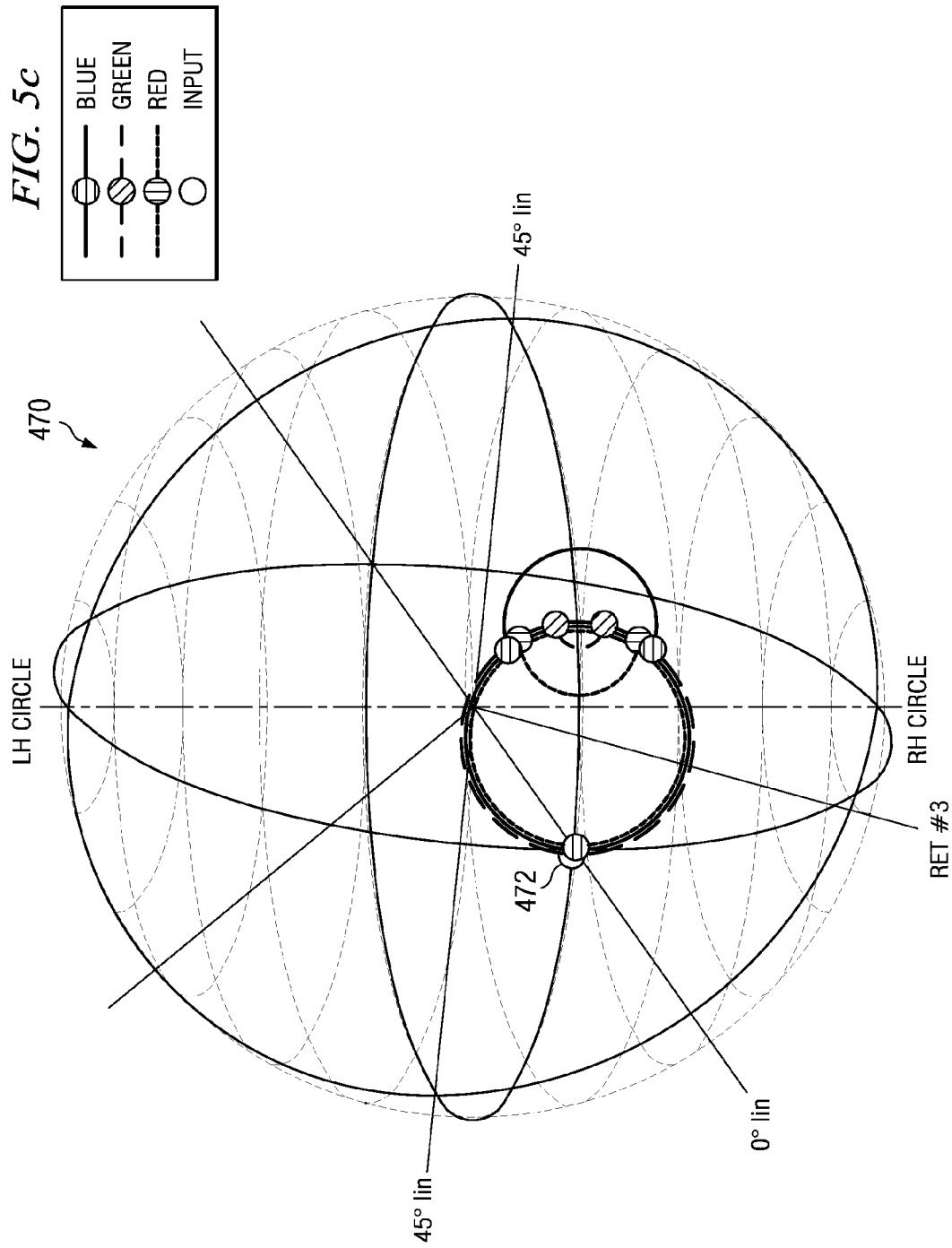
FIG. 5c is a Poincaré sphere graph illustrating the polarization transformations performed by an exemplary embodiment of the APS that is described with reference to FIG. 5a, when the ZTN LC cells impart no retardance.

The polarization transformations for the embodiment in the driven and relaxed states where θ=8° are illustrated using the Poincaré sphere graphs of FIGS. 5c and 5d respectively. These graphs show the polarization transformations of light on an optical path at each element. For instance, when the LC cells are in the driven state, they hardly impart any retardance, resulting in the transformations 470 shown in FIG. 5c. In contrast, when the LC cells are in the relaxed state, they each impart a half wavelength of retardance to provide the transformations 500 shown in FIG. 5d. Accordingly, at retarder 404 of FIG. 5a, input linearly polarized light at point 502 undergoes a transformation to points 504, 506, 508 for blue, green, and red spectral wavelengths respectively. When LC pi-cell 406 is in the relaxed state, as illustrated here, light from points 504, 506, 508 is transformed to points 510, 512, 514 respectively. Retarder 408 then transforms light from points 510, 512, 514 to 516, 518, 520 respectively. When LC pi-cell 410 is in the relaxed state, light from points 516, 518, 520 is transformed to points 522, 524, 526 respectively. Next, retarder 412 transforms light from points 522, 524, 526 to 522, 524, 526 respectively.

The symmetry of the elements in both cases contributes to the overall stable achromatic performance. Once again, compensation using appropriate retarders may be used in some embodiments (e.g., in the exemplary embodiment of FIG. 6) in accordance with the principles disclosed herein. It should be noted that solutions with orientations and retardances close to those described in the exemplary embodiments may be used depending on the trade-off between desired spectral width and the level of blocking. Also, different LC cell and wave plate dispersion may be used to modify the performance.

Figure 6:
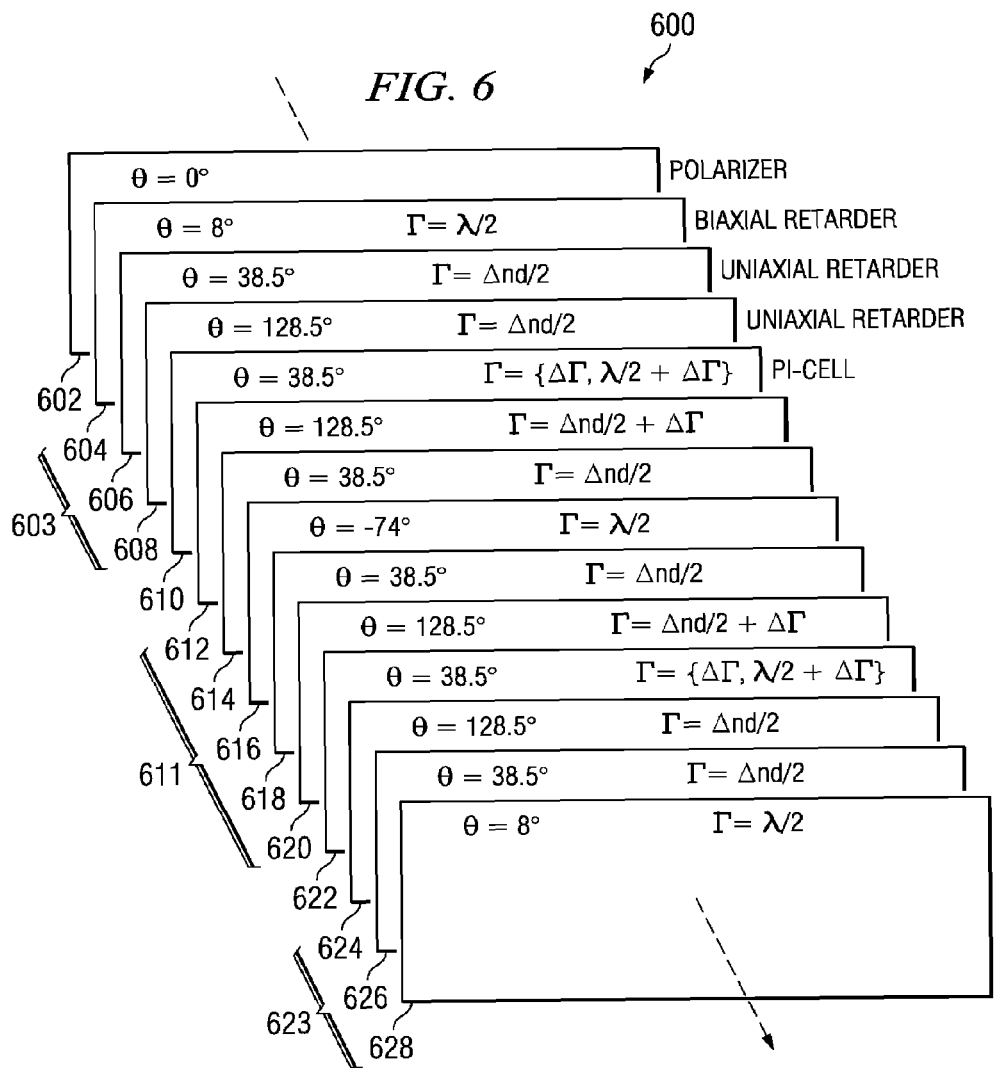
FIG. 6 is a schematic diagram illustrating a fourth exemplary embodiment of an APS in accordance with the present disclosure.

FIG. 6 illustrates a fourth embodiment of an APS 600. This exemplary embodiment of APS 600 includes compensation elements, where θ=8°. APS 600 includes an input polarizer 602, first retarder stack 603, first LC pi-cell 610, second retarder stack 611, second LC pi-cell 622, and third retarder stack 623.

In this fourth embodiment, a first retarder stack 603 is located on an optical path between input polarizer 602 and first LC pi-cell 610, and includes biaxial retarder 604 with R(8°, λ/2), uniaxial retarder 606 with R(38.5°, Δnd/2), and uniaxial retarder 608 with R(128.5°, Δnd/2). Second retarder stack 611 is located on an optical path between first LC pi-cell 610 and second LC pi-cell 622, and includes uniaxial retarder 612 with R(128.5°, Δnd/2+ΔΓ), uniaxial retarder 614 with R(38.5°, Δnd/2), biaxial retarder 616 with R(−74°, λ/2), uniaxial retarder 618 with R(38.5°, Δnd/2), and uniaxial retarder 620 with R(128.5°, Δnd/2+ΔΓ). Third retarder stack 623 is located on an optical path after second LC pi-cell 622, and includes uniaxial retarder 624 with R(128.5°, Δnd/2), uniaxial retarder 626 with R(38.5°, Δnd/2), and biaxial retarder 628 with R(8°, λ/2).

The following design considerations may be considered with respect to the APS embodiments and systems described herein, including variations thereof.

Residual in-plane retardance in an APS may be negated by situating a retarder in series with the LC cell of the same retardance, and oriented at 90° to the LC's optic axis. In practice, making a retarder with the required small retardance (typically ΔΓ~20-30 nm) can be difficult. Thus, an alternative approach is to provide a retarder (or a retarder stack) with a net retardance of the desired ΔΓ between paired orthogonal retarders. This approach also acts to correct for off-axis effects.

Off-axis effects occur as a consequence of light passing though an LC at off-normal angles. In these situations, the large out-of-plane birefringence acts to alter polarization because it imparts retardance with incident angle-dependent optic axes. An approach for compensating for off-axis effects uses a negative birefringent material with the 3D same optic axis profile as the component (in this case the driven LC) that is being compensated. Since the driven LC is close to being homeotropic (i.e. oriented normal to the cell surfaces), a negative c-plate may be used to compensate for off-axis effects, in accordance with the teachings of commonly-assigned U.S. Pat. No. 10/696,853, filed Oct. 30, 2003 to Chen et al., which is hereby incorporated by reference. However, common retarder materials such as polycarbonate are not easily formed into c-plates and so an alternative is to use crossed retarders that mimic a c-plate in the incident planes containing the retarders optic axes (conventionally noted by the azimuthal incident angles φ=0° & 90°). In the bisecting planes of a single crossed retarder (φ=45° & 135°), polarization is mixed, so is of limited benefit. By placing crossed retarders either side of a driven pi-cell, off-axis effects can still be mitigated while maintaining net polarization integrity for φ=45° & 135° incidence.

In the absence of good c-plate or biaxial compensating elements, another overall compensating solution is to use two pairs of crossed retarders either side of the cell with a net in-plane retardance equivalent to the LC's residual. The typical retardance value for each of the compensating retarders would then be half the total birefringence Δnd of the cell to match with the LC.

As described so far, only the driven state of the APS will be compensated and the in-plane and off-axis effects in the relaxed state of the APS have been ignored. In-plane compensation is not required other than to reduce the voltage such that the difference of the compensating ~25 nm and the LCs retardance is still the desired ~260 nm. However, off-axis effects are significant in the relaxed LC state. Thus, in order to compensate the bent structure again, an equivalent negative birefringent structure may be placed in series. Although this is not a perfect solution, because it would act to cause off-axis effects in the driven state, several techniques may be used to provide the compensation. A first technique may involve using a negative birefringent structure to mimic closely the average structure between relaxed and driven states. However, this is presently difficult in practice to produce. A second technique may involve using the commercially available Fujifilm (described in POLARIZATION ENGINEERING FOR LCD PROJECTION,) which uses a suitable material system. However, a problem with this technique is that the described film is designed for twisted nematic TN displays and accordingly is not well-matched to the pi-cells described in the present disclosure. However, Fuji has introduced a compensation film for OCB mode LCD panels that is probably more appropriate. In the absence of a practical way of compensating the relaxed LC state, it is best to concentrate on the driven state but with the caveat that off-axis performance of the relaxed state cannot be worsened. Thus, compensating the driven state with crossed retarders appears to be consistent with this approach and in some cases can be better than using negative c-plate compensation.

Another general consideration with regard to the APSs according to the present disclosure is the switching speed of single pi-cells. To improve speed and reduce off-axis effects in the relaxed state, the single pi-cells may be substituted for two parallel aligned pi-cells with half the birefringence. This approach significantly increases switching speed (theoretically a four-fold improvement), but also improves off-axis polarization transformations as is described of the Color Switch™ in "Polarization Engineering for LCD Projection". It should be noted though that multiple reflections within an LC cell that imparts a quarter-wave retardance leads directly to leakage. So implementation of a practical APS with double pi-cells may call for low reflection at the LC/ITO interface, possibly including indexed matched coatings.

Symmetric In-Plane APS Embodiment

Figure 7A:
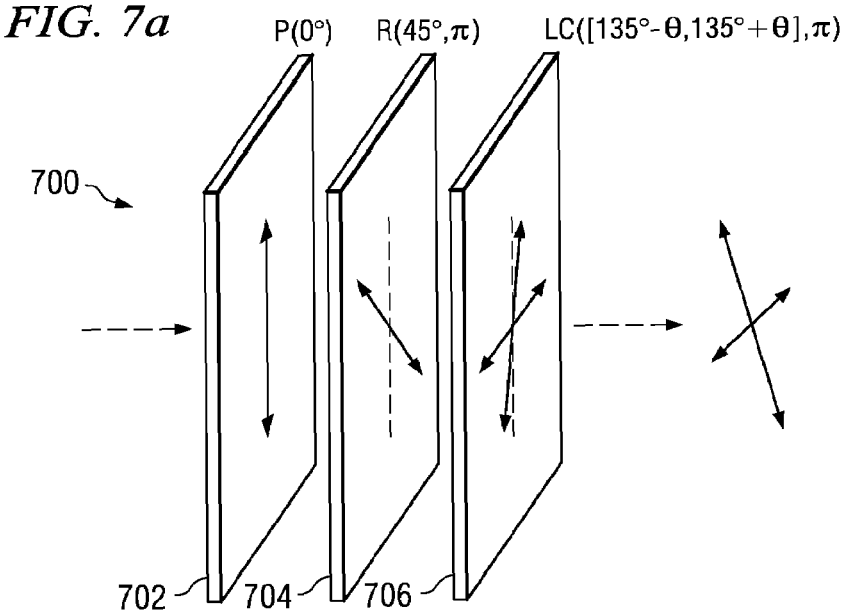
FIG. 7a is a diagram illustrating a fifth exemplary embodiment of an APS in accordance with the present disclosure.

In-plane switching of a half wave retarder can provide achromatic properties as it can be considered equivalent to two ZTN cells oriented at the in-plane switching angle with respect to each other. Solutions have already been discussed in commonly assigned U.S. Pat. No. 6,046,786 issued Apr. 4, 2000 (Sharp et al.). In situations where symmetric behavior is desired, various embodiments exist that minimize the average leakage over the visible spectrum for the two blocking states. For example, FIG. 7a illustrates a fifth embodiment of an APS 700, providing symmetry between output polarization states, thereby aligning the in-plane LC switches optic axes symmetrically either side of the axis bisecting the desired output linear polarization axes. Accordingly, the input polarization state may then be transformed between elliptical states whose major axis is also along this bisecting axis.

In this exemplary embodiment, APS 700 includes a linear polarizer 702, an input retarder 704, and an in-plane surface stabilized ferroelectric liquid crystal (SSFLC) device 706. SSFLC device 706 acts as a fixed retarder, whose optic axis reorients in the plane of the device as a consequence of applied electric field polarity. With approximately positive 5V, SSFLC device 706 may orient up to approximately +24° from the brushed alignment direction, and by applying approximately negative 5V, the orientation may be up to approximately negative 24° from the brushed alignment direction.

In operation, the actual switching angle of SSFLC device 706 can be tuned slightly by varying the applied voltage and controlling the temperature of the device. Being directly driven, SSFLC device 706 is typically faster (typically <100 μs) than nematic LC modulators (typically ~500 μs to relax) and show almost no switching asymmetry. The retardance of SSFLC device 706 is determined by the cell gap, and for polarization switching, is typically half-wave with cell gaps close to 2 μm. Being effectively in-plane uniaxial retarders in both states, SSFLC device 706 provides a good field-of-view, therefore off-axis compensation is generally not called for. Similarly, in-plane compensation is superfluous since there is no zero retardance state.

The embodiment in FIG. 7a is a symmetric approach to achromatic switching. Unlike prior disclosures in which one state may be very achromatic at the expense of the other, this embodiment provides substantially equivalent optical performance for both the driven and relaxed states. This optical performance can be visualized using the Poincaré transformations depicted in FIGS. 7c and 7d.

Figure 7B:
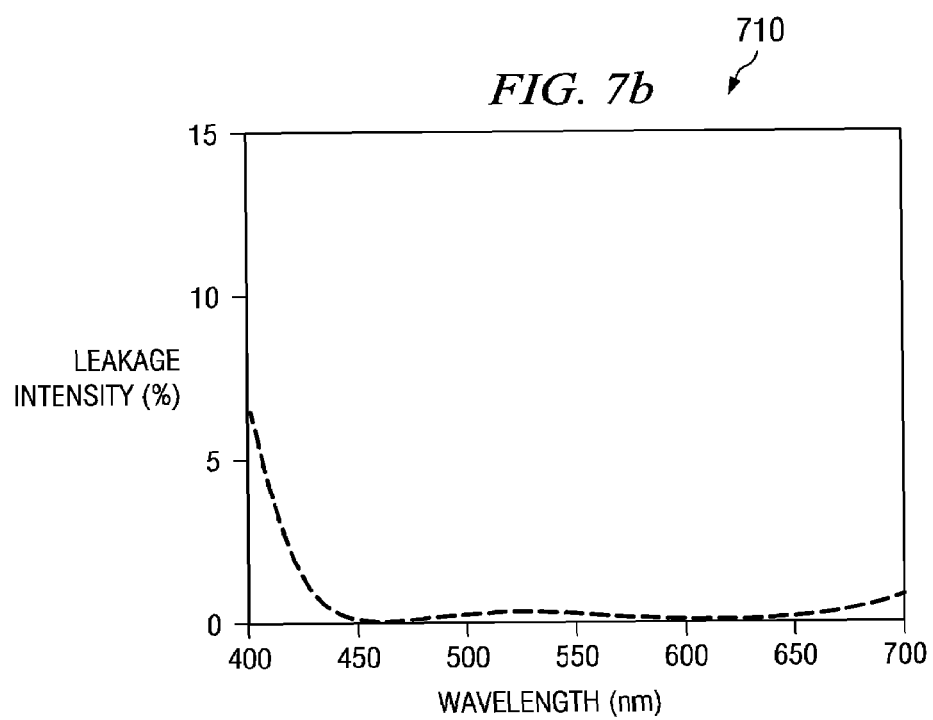
Figure 7C:
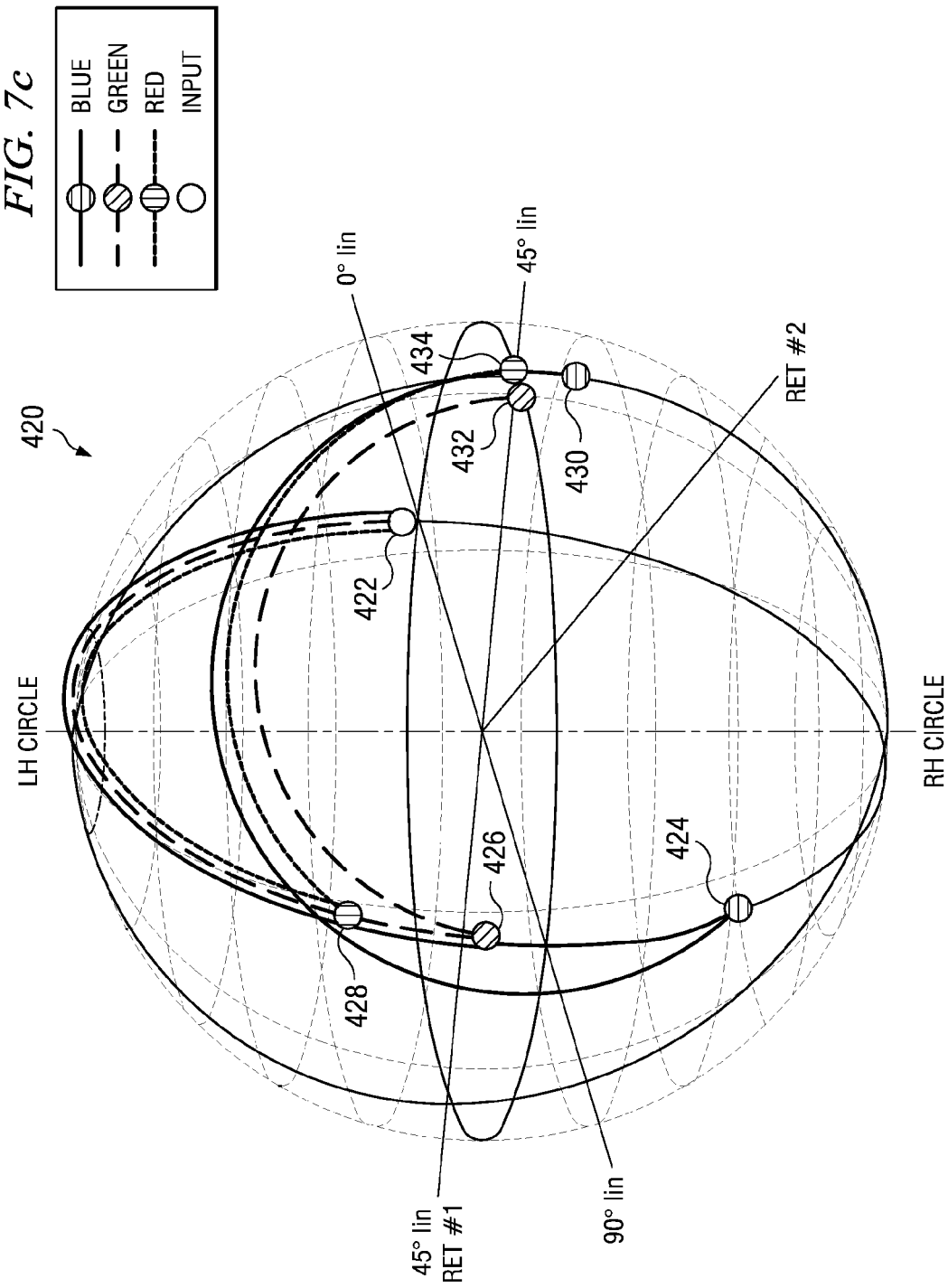

FIGS. 7c and 7d are Poincaré sphere graphs illustrating the polarization transformations of the fifth exemplary embodiment of the APS 700 when operating in first and second states respectively. These graphs show a linear input polarization state whose axis is at 45° is transformed with a single half wave retarder at 0° to form ±45° oriented elliptical polarization states for visible wavelengths; the polarization state for the design wavelength being linear. Typically, the design wavelength is chosen to be close to 520 nm in order to achromatize over the visible spectrum. In FIGS. 7c and 7d, R, G and B points on the spheres 420, 440 denote representative red, green and blue wavelengths of around 620 nm, 550 nm, and 450 nm respectively. With regard to FIG. 7c, point 422 represents input linearly polarized light, which undergoes a first transformation to point 424 for blue light, to point 426 for green light, and to point 428 for red light. A second transformation then maps points 424, 426, 428 to points 430, 432, 434 respectively, providing output linearly polarized light with an axis at positive 45° to the input linearly polarized light. In contrast, referring to FIG. 7d, point 442 represents input linearly polarized light, which undergoes a first transformation to point 444 for blue light, to point 446 for green light, and to point 448 for red light. A second transformation then maps points 444, 446, 448 to points 450, 452, 454 respectively, providing output linearly polarized light with an axis at negative 45° to the input linearly polarized light. Accordingly, the two optic axes of the SSFLC device 706 are then made to switch by approximately 24° symmetrically about the 135° orientation (i.e. making it the rubbing direction of the surface stabilized FLC 706), which maps the RGB polarizations close to the desired ±45° linear states (i.e., to points 430, 432, 434 or to points 450, 452, 454).

In accordance with this embodiment, sharing achromaticity reduces the average leakage of both states since leakage tracks the square of the error in polarization. By using an input retarder 704 with very low dispersion, a good achromatic performance can be achieved with typical FLC 706 dispersions as shown in FIG. 7b. Here, the optimum total switching angle was found to be 48° and the retardances were close to half wave (~260 nm at a wavelength of 520 nm) for APS 700.

In cases where a retarder with a suitable dispersion-match with the SSFLC device 706 is not available, it is possible to replace the input retarder 704 with a compound structure including two or more retarders. It should be appreciated that there are various multi-retarder solutions that can create a spread of elliptical polarization states oriented along the symmetric 45° direction that can match with an FLC material dispersion of choice.

It should also be appreciated that with respect to this fifth embodiment of an in-plane APS 700, and indeed in any in-plane FLC achromatic switch solution, equivalent performance can be obtained for normally incident light by replacing the FLC with two compensated ZTN devices oriented along the direction of the two FLC states.

Stereoscopic Imaging Systems

Used in conjunction with orthogonal analyzing eyewear, left and right eye images can be modulated in polarization to yield stereoscopic 3D imagery in both rear and front projection displays. Two examples of a stereoscopic imaging system are illustrated in FIGS. 8 and 9 that may use an APS according to the principles of the present disclosure.

Figure 8:
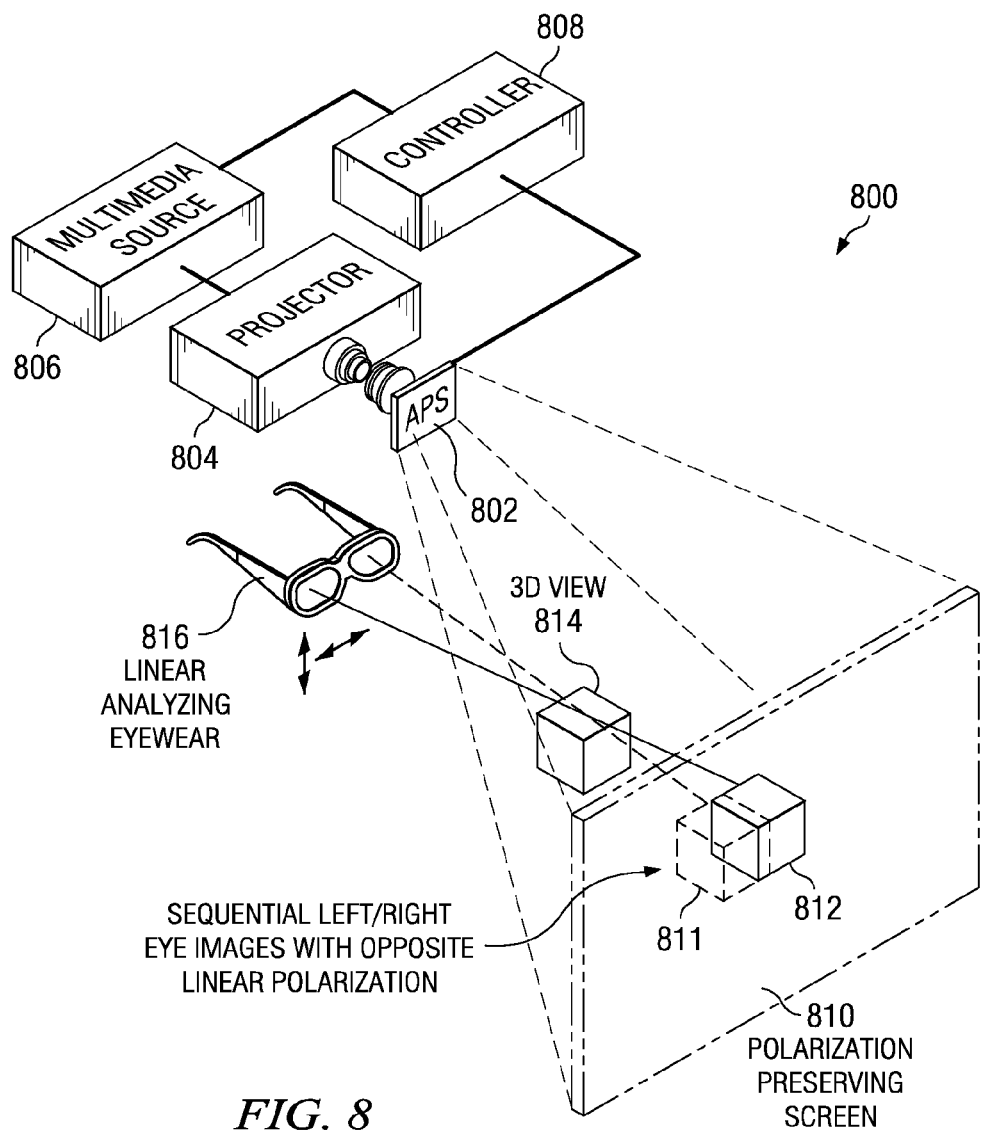
FIG. 8 is a diagram of an exemplary 3D stereoscopic projection system using an APS in accordance with the present disclosure.
Figure 9:
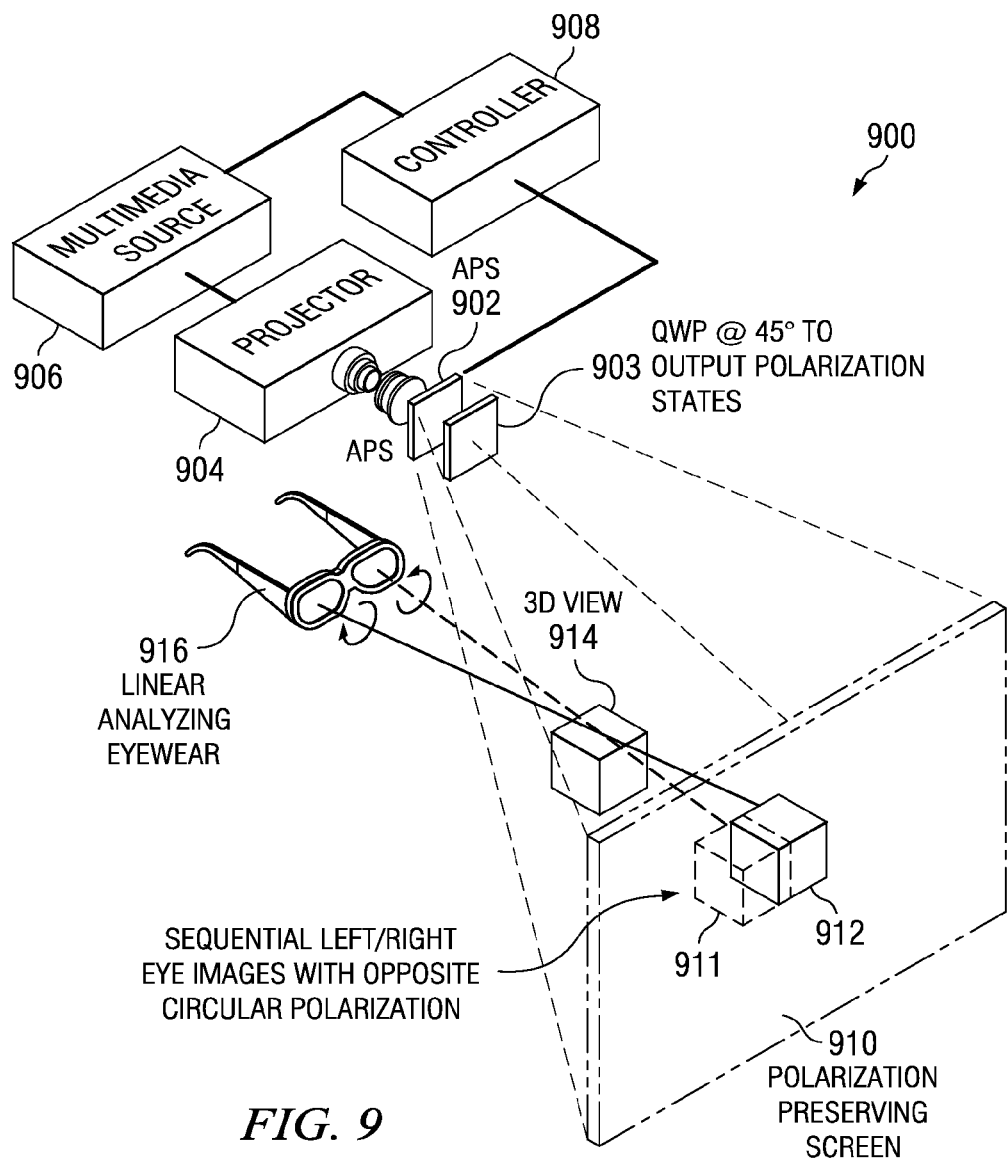
FIG. 9 is a diagram of another exemplary 3D stereoscopic projection system using an APS in accordance with the present disclosure.

FIG. 8 illustrates an exemplary stereoscopic imaging system 800 that utilizes linear polarization encoding to time-sequentially alter the output polarization state of a display in synchronization with time sequential images. System 800 includes APS 802, a projector 804, a multimedia source 806, a controller 808, and a polarization preserving screen 810.

To create an appealing flicker-free stereoscopic experience, high resolution full color images may be shown at a frame rate of at least 100 Hz (50 Hz per eye) and possible greater. This is possible using various microdisplay projection technologies, and can be envisioned for the future with faster direct view LCD displays. For example, projector 804 may employ microdisplay projection based on Texas Instruments DLP™ technology, as this provides an established technology capable of displaying projected images with high frame rate, albeit without polarized output. Using an APS with a non-polarized DLP projector necessitates polarizing the output with a neutral polarizer prior to the switch and loss of half the available light. Liquid crystal based projector technologies that deliver sufficient temporal performance may also be used with the desired polarized output, making it well matched to the described APSs.

In operation, a projector 804 capable of displaying alternate right and left eye images at a rate greater than 120 Hz ($<\frac{1}{60}^{th}$ second per image) may be synchronized with an APS 802 such that successive images are polarization encoded with orthogonal polarization states. Controller 808 controls APS 802 to provide synchronized alternating left and right eye images. Multimedia source 806 provides the video and audio content, and may be, for example, a DVD player, a digital video recorder, a computer, a decoded input stream from internet, cable, terrestrial or any broadcast service, or the like. In conjunction with the reflected images 811, 812 from polarization preserving screen 810, a viewer with linear analyzing eyewear 816 would then see right eye images 812 in the right eye and left eye images 811 in the left eye. Suitable stereo images would then result in a 3D image sensation 814.

With any polarization-based discrimination technique, complete two-dimensional images are formed with orthogonal polarization states. Although this has been described above with respect to a projection system, alternative display systems can be used, including spatially patterning direct-view displays with micro-polarizers, or by continuously displaying two full-color, high-resolution, orthogonal polarized images using two displays.

FIG. 9 illustrates an exemplary stereoscopic imaging system 900 that utilizes circular polarization encoding. System 900 includes APS 902, a projector 904, a multimedia source 906, a controller 908, a polarization preserving screen 910. System 900 further includes a 45° oriented quarter wave plate (QWP) 903 placed at the exit of the APS 902 to form orthogonal circular polarized states. Used with circular analyzing eyewear, 3D viewing is possible, providing the viewer with the ability to tilt their head.

In other embodiments, achromatic QWPs may be used with compatible eyewear. Additionally, other embodiments (not shown) may use polarization based color filters such that successive frames could be color coded for anaglyph operation. In such embodiments, the screen would not have to be polarization preserving, assuming the eyewear discriminates between eyes based on color. Other embodiments may also provide hybrid color with polarization systems, with matched polarization filter-based eyewear.

While several embodiments and variations of an achromatic polarization switch and systems for stereoscopic projection have been described above, it should be understood that they have been presented by way of example only, and not limitation. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. An achromatic polarization switch that transforms linearly polarized light of an initial polarization orientation, comprising:
    a first liquid crystal (LC) cell having a first axis of orientation relative to the initial polarization orientation; and
    a second LC cell having a second axis of orientation relative to the first axis of orientation;
    wherein the first and second LC cells are each operable to allow the linearly polarized light to pass without retardation in a first state, and are each operable to retard the linearly polarized light by substantially a half wavelength in a second state, and wherein the first and second LC cells simultaneously operate in the same state.

2. An achromatic polarization switch according to claim 1, wherein the first state is operable to transform light passing through the achromatic polarization switch to a first linear polarization orientation, wherein the second state is operable to transform light passing through the achromatic polarization switch to a second linear polarization orientation, and wherein the first linear polarization orientation is substantially orthogonal to the second linear polarization orientation.

3. An achromatic polarization switch according to claim 1, further comprising a driver electrically coupled to the first and the second LC cells, the driver being operable to simultaneously drive the first and the second LC cells between the first state and the second state.

4. An achromatic polarization switch according to claim 3, wherein the first state comprises driving the first and second LC cells within a high voltage range, and wherein the second state comprises driving the first and second LC cells within a low voltage range.

5. An achromatic polarization switch according to claim 4, wherein the high voltage range is between 15 to 30 volts, and wherein the low voltage range is between zero to five volts.

6. An achromatic polarization switch according to claim 5, wherein the high voltage applied to the first LC cell differs from the high voltage applied to the second LC cell.

7. An achromatic polarization switch according to claim 3, wherein the first and second LC cells are simultaneously driven with substantially equal voltage levels.

8. An achromatic polarization switch according to claim 1, wherein the first and second LC cells are zero-twist nematic cells.

9. An achromatic polarization switch according to claim 1, further comprising a linear polarizer operable to linearly polarize light to the initial polarization orientation, wherein the linear polarizer is located on an optical path, wherein the first LC cell is located on the optical path after the linear polarizer, and wherein the second LC cell is located on the optical path after the first LC cell.

10. An achromatic polarization switch according to claim 1, wherein the first axis of orientation is approximately 45 degrees from the second axis of orientation.

11. An achromatic polarization switch according to claim 1, wherein the first axis of orientation is substantially 22.5 degrees relative to the initial polarization orientation.

12. An achromatic polarization switch according to claim 11, wherein the second axis of orientation is in the range of 40 to 45 degrees relative to the first axis of orientation.

13. An achromatic polarization switch according to claim 12, wherein the second axis of orientation is substantially 67.5 degrees relative to the initial polarization orientation.

14. An achromatic polarization switch according to claim 1, further comprising:
a first half-wave retarder located on an optical path between the first and second LC cells; and
a second half-wave retarder on the optical path after the second LC cell,
wherein the first axis of orientation is at an angle $\theta_1$ degrees from the initial polarization orientation,
wherein the first half-wave retarder has an axis of orientation at $\theta$ degrees relative to the initial polarization orientation,
wherein the angle of the second axis of orientation relative to the initial polarization orientation is $(45+2\theta-\theta_1)$ degrees, and
wherein the second half-wave retarder has an axis of orientation of $(\theta+90)$ degrees relative to the initial polarization orientation.

15. An achromatic polarization switch according to claim 1, wherein the first axis of orientation is substantially the same as the second axis of orientation.

16. An achromatic polarization switch according to claim 15, further comprising:
a first half-wave retarder oriented at $\theta$ degrees relative to the initial polarization orientation, the first half wave retarder being located on an optical path before the first LC cell;
a second half-wave retarder oriented at $(2\theta+90)$ degrees relative to the initial polarization orientation, the second half-wave retarder being located on an optical path between the first and second LC cells; and
a third half wave retarder oriented at $\theta$ degrees relative to the initial polarization orientation, the third half wave retarder being located on an optical path after the second LC cell.

17. An achromatic polarization switch according to claim 16, wherein the first and second axes of orientation are oriented at an angle $2\theta\pm22.5$ degrees relative to the initial polarization orientation.

18. An achromatic polarization switch comprising:
a linear polarizer operable to linearly polarize light along an optical path;
a first retarder located on the optical path after the linear polarizer;
a first liquid crystal (LC) cell located on the optical path after the first retarder;
a second retarder located on the optical path after the first LC cell;
a second LC cell located on the optical path after the second retarder; and
a third retarder located on the optical path after the second LC cell.

19. An achromatic polarization switch according to claim 18, further comprising a driver electrically coupled to the first and the second LC cells, the driver being operable to drive the first and the second LC cells between a first state and a second state, wherein the first state is operable to transform light passing through the achromatic polarization switch to a first linear polarization state, and wherein the second state is operable to transform light passing through the achromatic polarization switch to a second linear polarization state, wherein the first linear polarization state is substantially orthogonal to the second linear polarization state.

20. An achromatic polarization switch according to claim 18, wherein the first and second LC cells are zero-twist nematic cells.

21. An achromatic polarization switch that transforms linearly polarized light of an initial polarization orientation, comprising:
a retarder oriented at substantially 45 degrees to the initial input polarization, wherein the retarder is located on an optical path following the linear polarizer, wherein the retarder has a retardance of a half wavelength; and
a surface stabilized ferroelectric liquid crystal (SSFLC) cell having a retardance of a half wavelength, wherein the optic axis orientation of the SSFLC changes in response to an applied electric field.

22. An achromatic polarization switch according to claim 21, wherein the SSFLC has a relaxed state optic axis of substantially 135 degrees relative to the initial polarization orientation, wherein the SSFLC is in the relaxed state when no electric field is applied.

23. An achromatic polarization switch according to claim 22, wherein the SSFLC cell orientation rotates about the relaxed state optic axis in a range from plus 25 degrees to minus 25 degrees as a consequence of applied electric field polarity.

24. An achromatic polarization switch according to claim 22, further comprising a driver electrically coupled to the SSFLC, the driver being operable to drive the SSFLC between a first state and a second state, wherein the first state is operable to rotate the orientation of the SSFLC in one direction about the relaxed state optic axis, and the second state is operable to rotate the orientation of the SSFLC in an opposite direction about the relaxed state optic axis.

25. A projection system that provides achromatic stereoscopic imaging, comprising:
    a projection subsystem operable to output modulated light; and
    an achromatic polarization subsystem operable to receive the modulated light from the projection subsystem, comprising:
        a first liquid crystal (LC) cell having a first axis of orientation relative to the initial polarization orientation; and
        a second LC cell having a second axis of orientation relative to the first axis of orientation;
        wherein the first and second LC cells are each operable to allow the linearly polarized light to pass without retardation in a first state, and are each operable to retard the linearly polarized light by substantially a half wavelength in a second state, and wherein the first and second LC cells simultaneously operate in the same state.

26. A projection system according to claim 25, wherein the first state is operable to transform light passing through the achromatic polarization subsystem to a first linear polarization orientation, wherein the second state is operable to transform light passing through the achromatic polarization subsystem to a second linear polarization orientation, and wherein the first linear polarization orientation is substantially orthogonal to the second linear polarization orientation.

27. A projection system according to claim 25, further comprising a driver electrically coupled to the first and the second LC cells, the driver being operable to simultaneously drive the first and the second LC cells between the first state and the second state.

28. A projection system according to claim 27, wherein the first state comprises driving the first and second LC cells within a high voltage range, and wherein the second state comprises driving the first and second LC cells within a low voltage range.

29. A projection system according to claim 25, further comprising a lens to direct light output from the achromatic polarization subsystem toward a projection screen.

30. A projection system according to claim 25, wherein the first state and the second states of the achromatic polarization subsystem are synchronized with the output modulated light from the projection subsystem.

31. A projection system according to claim 25, further comprising at least one retarder between the first LC cell and the second LC cell.

32. A projection system according to claim 25, further comprising at least a first retarder on an optical path before the first LC cell, and at least a second retarder after the second LC cell.

33. A projection system according to claim 25, wherein the first and the second LC cells are zero-twist nematic cells.

34. A projection system according to claim 25, wherein the achromatic polarization subsystem further comprises a linear polarizer.

35. A projection system according to claim 25, further comprising a quarter-wave plate located on the optical path after the achromatic polarization subsystem.

36. A projection system that provides achromatic stereoscopic imaging, comprising:
    a projection subsystem operable to output modulated light; and
    an achromatic polarization subsystem that transforms linearly polarized light of an initial polarization orientation, comprising:
        a retarder oriented at substantially 45 degrees to the initial input polarization, wherein the retarder is located on an optical path following the linear polarizer, wherein the retarder has a retardance of a half wavelength; and
        a surface stabilized ferroelectric liquid crystal (SSFLC) cell having a retardance of a half wavelength, wherein the optic axis orientation of the SSFLC alters in response to an applied electric field.

37. A projection system according to claim 36, further comprising a quarter-wave plate located on the optical path after the achromatic polarization subsystem.

* * * * *